US006454174B1

(12) United States Patent
Sansone (10) Patent No.: US 6,454,174 B1
(45) Date of Patent: Sep. 24, 2002

(54) METHOD FOR READING ELECTRONIC TICKETS

(75) Inventor: Ronald P. Sansone, Weston, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 09/573,364

(22) Filed: May 19, 2000

(51) Int. Cl.[7] .............................................. G06K 19/06
(52) U.S. Cl. ......................... 235/494; 283/902; 705/5; 705/26
(58) Field of Search ............................. 235/494; 705/5, 705/26, 27; 283/902

(56) References Cited

U.S. PATENT DOCUMENTS

| | | | |
|---|---|---|---|
| 5,598,477 A | | 1/1997 | Berson .......................... 380/51 |
| 5,754,933 A | * | 5/1998 | Orndorff ...................... 399/366 |
| 5,801,944 A | * | 9/1998 | Kara |
| 6,032,863 A | * | 3/2000 | Nethery, III ............ 235/462.07 |
| 6,223,166 B1 | | 4/2001 | Kay .............................. 705/26 |
| 6,233,565 B1 | * | 5/2001 | Lewis et al. ................... 705/35 |
| 6,240,396 B1 | | 5/2001 | Walker et al. ................. 706/26 |
| 6,249,835 B1 | | 6/2001 | Isoda .......................... 710/201 |
| 6,305,718 B1 | * | 10/2001 | Kendrick ...................... 283/93 |

FOREIGN PATENT DOCUMENTS

JP    2002-272219 A1 * 10/2000

* cited by examiner

Primary Examiner—Mark Tremblay
(74) Attorney, Agent, or Firm—Ronald Reichman; Angelo Chaclas (57) ABSTRACT

This invention produces a unique number that identifies the purchaser of the ticket based upon information obtained about the purchaser and the purchaser's computer system during the purchase of the ticket. The system will produce an additional unique number that may take the form of a bar code that is printed on the ticket during the production of the ticket. The bar code may be encrypted and related to the printer that printed the ticket. A reader at the location that the ticket is presented for the purchaser's entrance reads the bar code that contains information about the printer that printed the ticket and verifies the information contained in the bar code.

21 Claims, 12 Drawing Sheets

METHOD FOR READING ELECTRONIC TICKETS

CROSS REFERENCE TO RELATED APPLICATIONS

Reference is made to commonly assigned copending patent application Ser. No. 09/575,312 filed herewith entitled "A Method For Issuing Electronic Tickets" in the name of Ronald P. Sansone; Ser. No. 09/575,354 filed herewith entitled "A Method For Issuing Electronic Tickets" in the name of Ronald P. Sansone; and Ser. No. 09/575,314 filed herewith entitled "A Method For Automatically Reading Electronic Tickets" in the name of Ronald P. Sansone.

FIELD OF THE INVENTION

The subject invention relates to a method for printing tickets at remote locations and, more particularly, to printing readable tickets at remote locations.

BACKGROUND OF THE INVENTION

Tickets such as concert, theater, movie, museum, trade show, airline and sports tickets, etc., are documents having a substantial, intrinsic value which, typically, may be presented by any bearer to gain admittance or exercise an entitlement. Since such tickets may have substantial cash value there, exists a continuing problem of preventing the issuance of fraudulent tickets.

The issuance of many types of tickets, such as theater tickets, is currently controlled by means of controlled supplies (e.g. serialized ticket stock, specially printed ticket stock, etc.) and by allowing tickets to be issued only by controlled, authorized issuers (e.g. ticket agents). Controlled supplies are expensive, difficult to control, and prone to theft or counterfeiting. Typically, one stood in line to purchase a ticket at the place the event was being held or purchased the ticket over the phone from an authorized ticket agent who mailed the ticket to the purchaser.

Currently, ticketing companies are giving purchasers the option of printing their electronic tickets at home, using ordinary paper, a personal computer printer and an Internet connection. One of the problems in allowing people to print tickets at home is to ensure that the tickets are not counterfeit.

Unfortunately, electronic tickets may be produced fraudulently by insiders working at the ticket company by digitally pasting portions of a legitimate ticket on another ticket to produce a fake ticket. Hackers may also go into the ticket company's data base or listen to the ticket company's transmissions to produce fraudulent tickets.

SUMMARY OF THE INVENTION

This invention overcomes the disadvantages of the prior art by producing a unique number on a ticket that identifies the purchaser of the ticket based upon information obtained about the purchaser and the purchaser's computer system during the purchase of the ticket. The system will produce an additional unique number that may take the form of a bar code that is printed on the ticket during the production of the ticket. The bar code may be encrypted and related to the printer that printed the ticket. A reader at the location that the ticket is presented for the purchasers entrance reads the bar code that contains information about the printer that printed the ticket and verifies the information contained in the bar code.

The electronic ticket will contain an encrypted bar code that contains information about the personal computer printer that printed the ticket. The foregoing information will be difficult for a forger to obtain. Thus, it will be more difficult to produce fake tickets.

BRIEF DESCRIPTION OF THE DRAWINGS

FIG. 2 is a drawing of graphic field 21 or tell 21 of FIG. 1 and an enlarged version of graphic field 21 that becomes graphic field 21a;

FIG. 3 is a drawing showing graphic field 21a and segments 34, 35 and 36 that make up an enlarged version of graphic field 21a;

DETAILED DESCRIPTION OF PREFERRED EMBODIMENTS OF THE INVENTION

Figure 1:
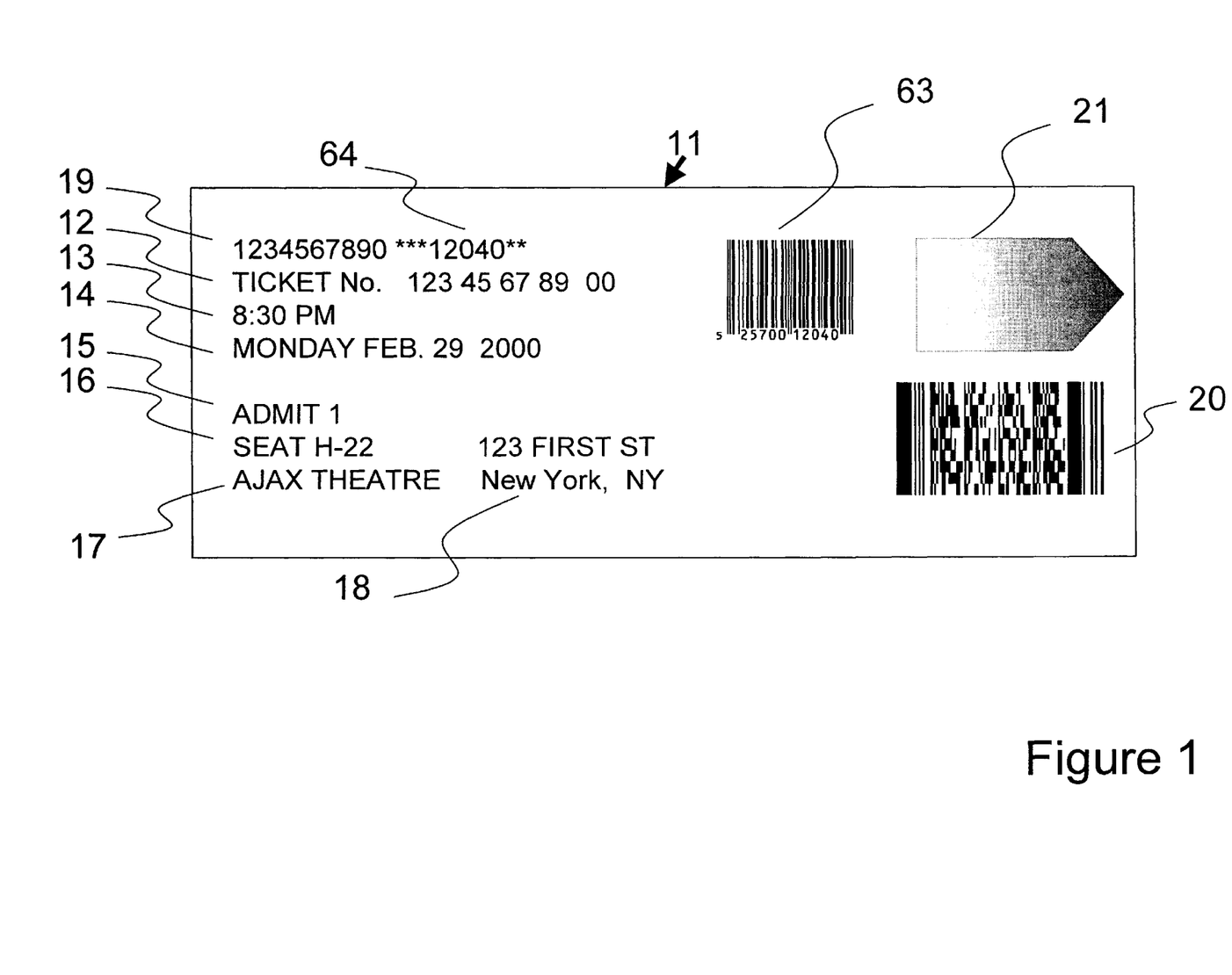
FIG. 1 is a drawing of an electronic ticket having a graphic field or tell.

Referring now to the drawings in detail, and more particularly to FIG. 1, the reference character 11 represents an electronic ticket that may be used for admission to any place, service, or event that current tickets allow admission. Electronic ticket 11 may have been produced by a printer coupled to a computer or by a printer of an electronic postage meter or automatic teller machine (ATM) printer. Ticket 11 includes a serial number 12; the time 13 of the event the ticket holder is entitled to admission; the date of the event 14; the number of people designated to admit, or the names of the people allowed admission 15; the ticket holder(s) seat number 16; the name of the place of the event 17; the address of the event 18; a unique number 19 that represents a computer record; a bar code 20, which may be a two dimensional encrypted bar code i.e., the PDF417 standard developed by Symbol Technologies Inc. of Bohemia, N.Y.; a graphic field or tell 21; a proof code or bar code 63 that represents the printer settings (printer manufacturer, model no., resolution, density, etc) of the printer that printed ticket 11; and, a numeric number 64 that represents the printer settings (printer manufacturer, model no., resolution, density, etc) of the printer that printed ticket 11. Bar code 20 contains in coded form the name of the place of the event 17, the address of the event 18, and a unique number 19. Bar code 63 and number 64 may be encrypted. Bar code 63 and number 64 may also be used to validate the printer that prints ticket 11.

Figure 2:
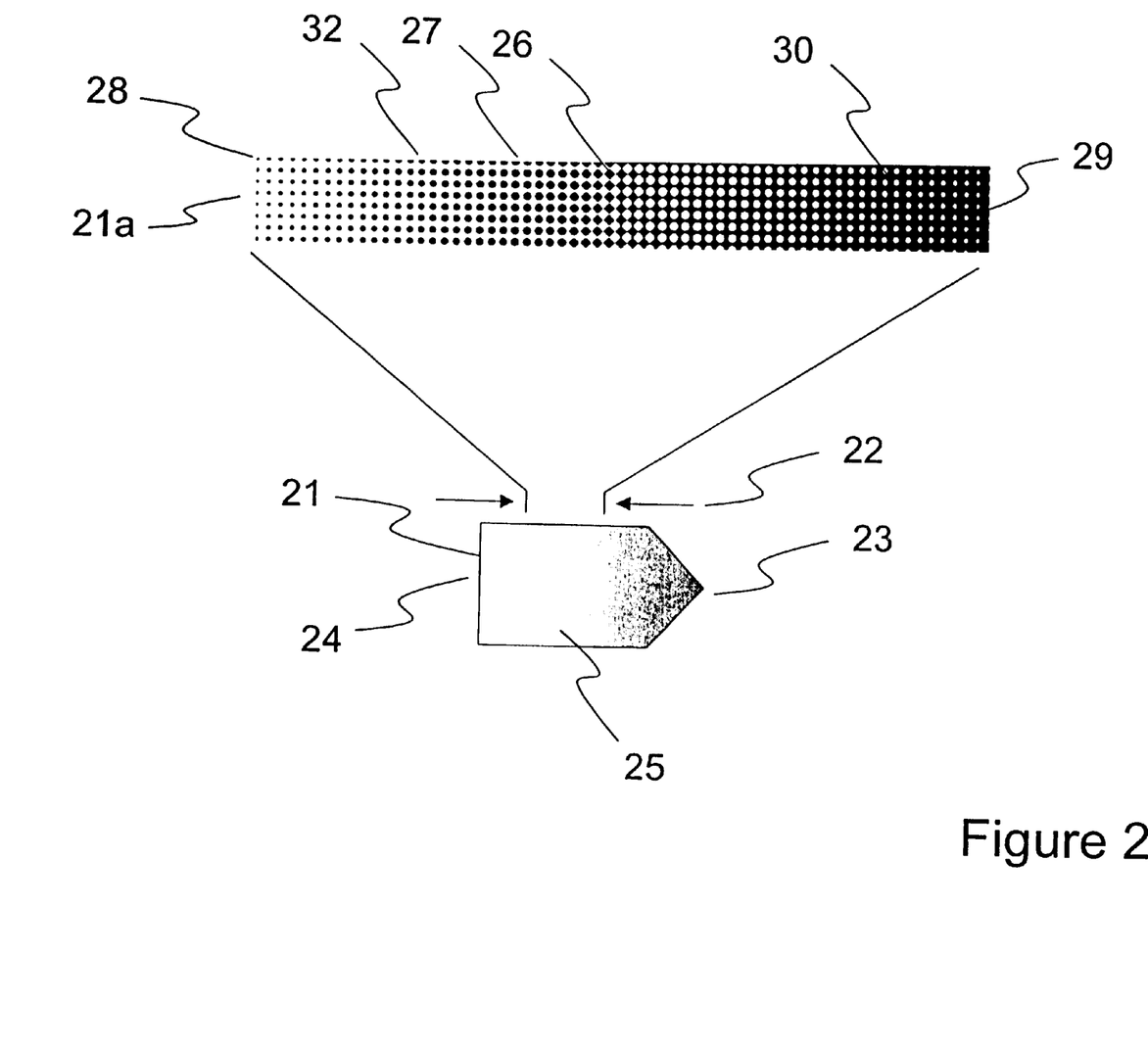

FIG. 2 is a drawing of graphic field 21 or tell 21 of FIG. 1 and an enlarged version of graphic field 21 that becomes graphic field 21a. Graphic field 21 or tell 21 is a variable half-tone screen print that is designed to appear black at its edge 23, near white at its right edge 24, and shades of gray in region 25. Section 22 of graphic field 21 is an enlarged version of region 25. Section 22 shows the effect of varying the black printed spots 26 and white background 27. White background 27 decreases in size from edge 28 to edge 29. Within region 30, white background 27 becomes completely surrounded by black spots 26. Within region 32, white background 27 appears to increase in size as one approaches edge 28.

Half toning is the process used to produce graphic field 21. Half toning is a technique that is used by printers to represent a gray scale image on a bi-level (black and white) page. Half toning breaks up an image into spots of varying sizes to simulate the original image. The human eye perceives a shade of gray depending on the percentage of ink coverage. Black and white laser and ink jet computer printers use ink or toner of only one blackness. Therefore, to produce various shades of gray to reproduce a continuous gray scale image, the image is broken into a series of spots. Varying the spot sizes approximates the shades of gray.

Thus, a group of large spots placed closely together appears black. A group of smaller spots with larger spaces between them produces a pale gray shade. A group of even smaller black spots spaced widely apart would appear almost white.

Graphic field 21 consists of a continuously varying tone area. Field 21 is a field where the range of tone has been pre-selected to provide a continuum of spots that slowly vary from small white backgrounds with large black spots to small black spots on a white background. "Small" is defined as being below the resolution limit of the human eye. When printed by a laser or ink jet printer, graphic field 21 appears black at its edge 23, near white at its edge 24, and shades of gray in region 25.

Figure 3:
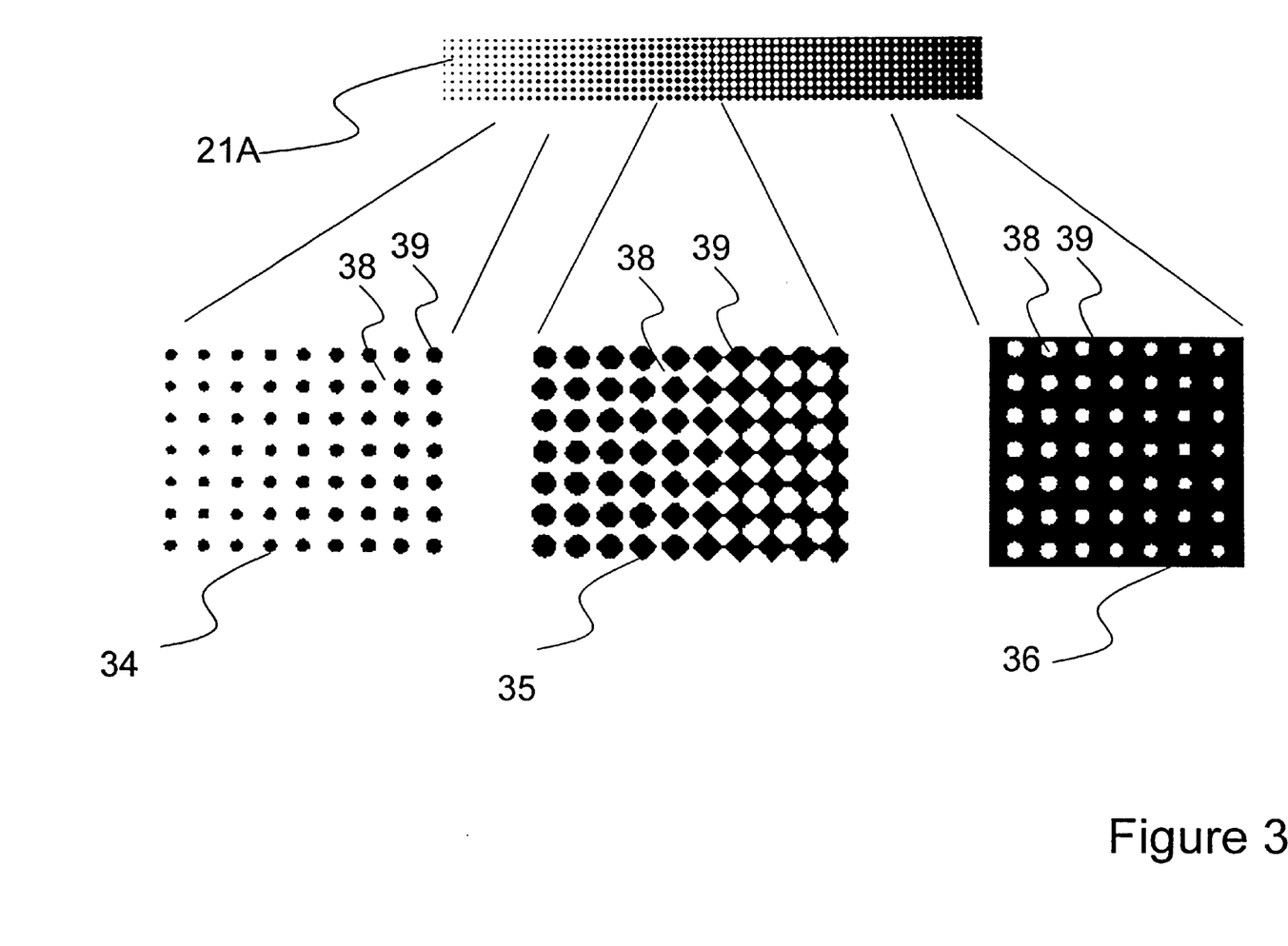

FIG. 3 is a drawing showing graphic field 21a and segments 34, 35 and 36 that make up an enlarged version of graphic field 21a. Within region 36, white background 38 becomes completely surrounded by black spots 39. Within region 35, white background 39 appears as white open areas at its left edge and white squares at its right edge. Within region 34, white background 38 completely surrounds varying size black spots 39.

Figure 4:
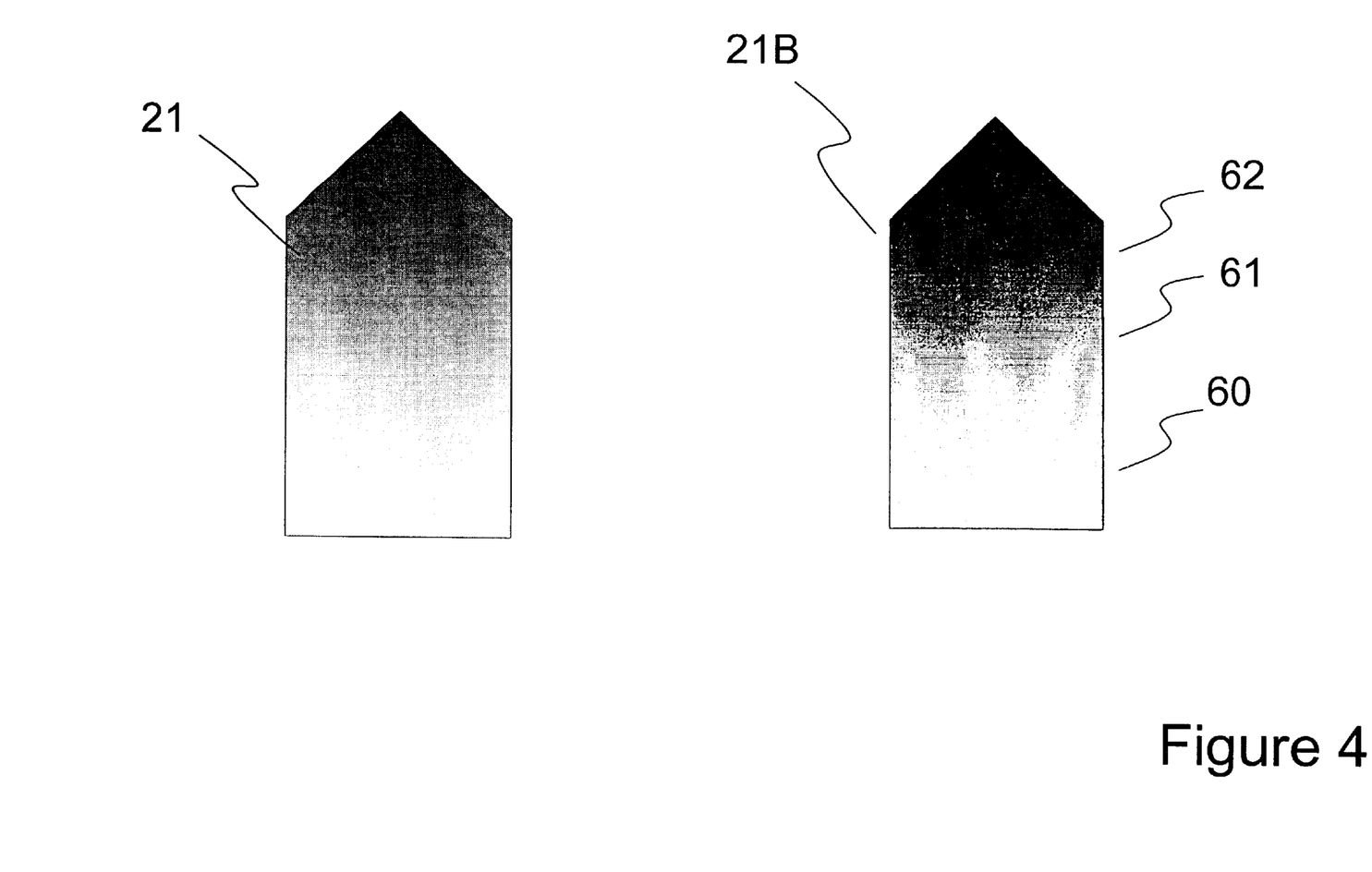
FIG. 4 is a drawing showing graphic field 21 and how graphic field 21 would be distorted by the photocopying and/or scanning/printing process to look like graphic field 21B.

FIG. 4 is a drawing showing graphic field 21 and how graphic field 21 would be distorted by the photocopying and/or scanning/printing process to look like graphic field 21B. The original print tone of graphic field 21 is uniform gray gradient. When graphic field 21 is photocopied and/or scanned/printed graphic field 21B will vary from black to white. Graphic field 21B will have visible bands 60, a mottled area 461, and an expanded black tone area 62. Thus, graphic field 21 does not look the same as graphic field 21B.

Laser and ink jet printers would print graphic field 21 as described in the description of FIGS. 2 and 3. The aforementioned printers are designed in such a manner that when they print graphic field 21, graphic field 21 appears to the average human eye to be free of objectionable variation. The printers are not concerned with how a photocopy and/or how a scanned/printed copy of graphic field 21 would look. However, the non-linear reproduction characteristics of a photocopier and/or a scanner/printer will magnify these non-perceivable, process-produced variations in graphic field 21 and produce graphic field 21B. The peculiarities of the human eye further magnify the now visible process errors. The errors manifest themselves as mottled area 461 in graphic field 21B, whereas in region 25 of graphic field 21, a smooth gray tone exists.

Figure 5:
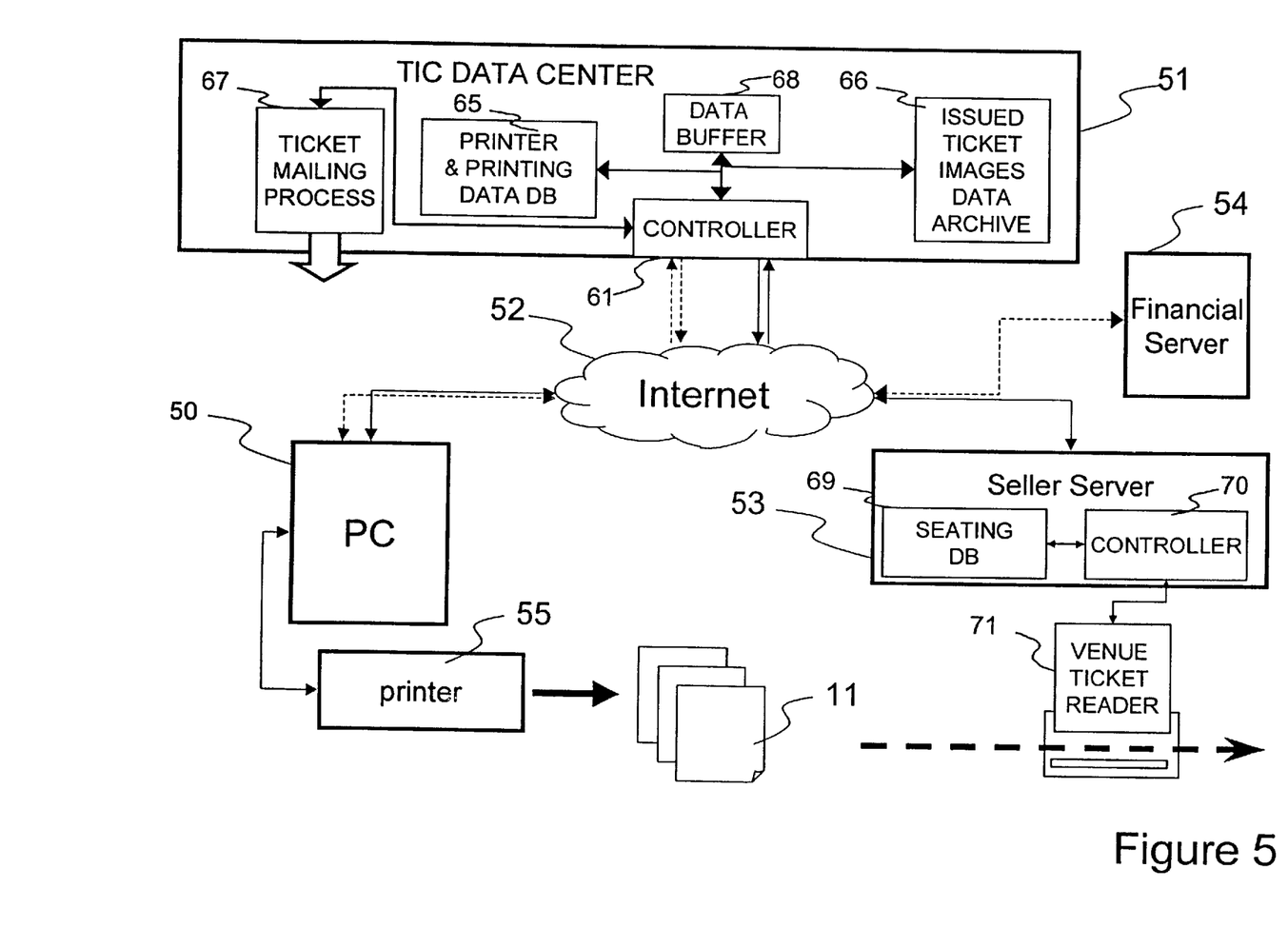
FIG. 5 is a drawing showing how tickets may be purchased over the Internet.

FIG. 5 is a drawing showing how tickets may be purchased over the Internet. A purchaser wishing to obtain an electronic ticket, inputs information through input device 50, which may be a personal computer, or an non-intelligent terminal device, or any other suitable input device, to ticket image control data center 51 via internet 52. Data center 51 includes a printer and printing data base 65; an issued ticket images data archive 66 that is coupled to data base 65; a controller 67 that is coupled to data base 65 archive 66, and ticket mailing process 67; and a venue seat data base 68 that is coupled to controller 67. Data base 65 contains a list of printers which may successfully print graphic field 21 and the parameters required for each printer to print graphic field 21. Archive 66 stores the issued tickets in accordance with the unique number assigned to each ticket. Controller 67 is used to control the ticket image production and reproduction of ticket 11, and venue seat data base 68 contains the seats that are being processed for delivery for each event. Ticket mailing process 67 is used if printer 55 can not print acceptable tickets 11.

Data center 51 communicates with a ticket seller server 53 via internet 52 to obtain information as to the availability of suitable events consistent with what the purchaser desires. Server 53 will handle all the specifics that the ticket entitles one to receive. Server 53 will also handle the payment for the ticket, i.e., credit card. Server 53 includes a seating data base 69 and a controller 70 that is coupled to data base 69. Seating data base 69 contains the seat assignments for each specific event, i.e., the 3:00 P.M. performance at theater 17. Controller 70 controls the seating process for booking over internet 52 and provides a look up for venue ticket reader 71. Reader 71 may be a bar code or optical reader that is used to read and validate the information on ticket 11. Server 53 also communicates with financial server 54 and data center 51 to validate payment information. If the purchaser wants to purchase the ticket(s) that server 53 has available at the price specified by server 53, and server 54 is satisfied with the purchaser's credit, server 53 will inform data center 51 of these facts. Data center 51 will compose ticket 11. Data center 51 will download the purchased ticket(s) to computer 50. Personal computer printer 55 (laser, ink jet, facsimile machine) will print ticket(s) 11.

Graphic field 21 or tell 21 will be printed on ticket 11 as shown in FIG. 1. If ticket 21 is reproduced by photocopying and/or scanning/printing, graphic field 21 will display a mottle image 461, as shown in FIG. 4. Thus, a ticket agent will be able to visualize when a ticket is a copy.

FIGS. 6A–6F is a flow chart showing the interaction of the program in server 53 with the program in computer 50 and the program in controller 67. The programs begin in block 99 of computer 50 where a prospective buyer indicates that he is interested in ticket choices. Then the program goes to block 100 of server 53. Decision block 100 determines whether or not a seller has received a new request. If block 100 determines that a new request has not been received, the program goes back to the input of block 100. If block 100 determines that a new request has been received, the program goes to the input of block 101. Block 101 offers venue choices to the buyer, i.e. for what event do you want to purchase tickets, when do you want to go to the event, to what location do you want to go, what is the price range of seats you want, where do you want to sit, how many tickets do you want to buy, etc. Then the program goes to block 102 in buyer computer 50, where the buyer makes the venue choices. After the buyer has made the choices, the program goes to block 103, where the buyer indicates that he is interested in purchasing one or more tickets.

Figure 6A:
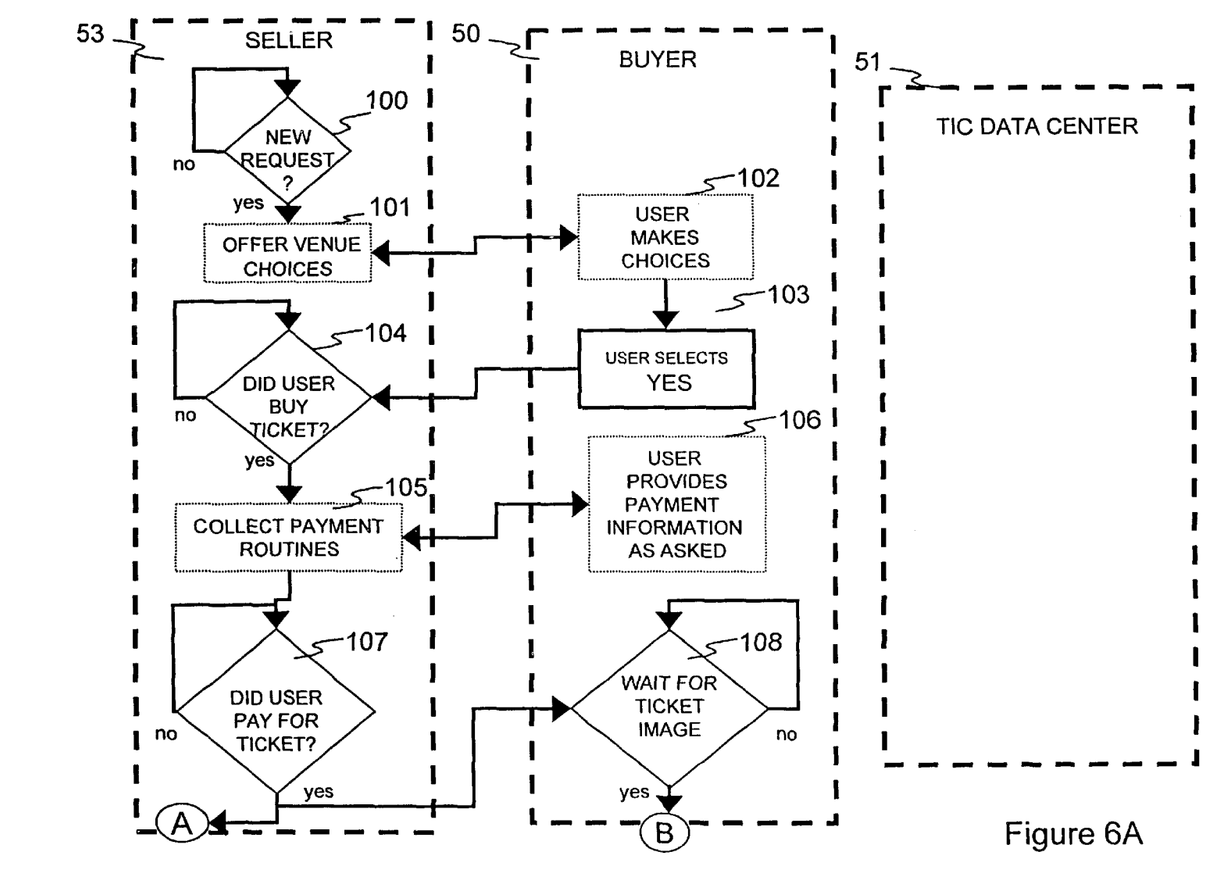
FIGS. 6A–6F is a flow chart showing the interaction of the program in server 53 with the program in computer 50 and the program in controller 67.
Figure 6B:
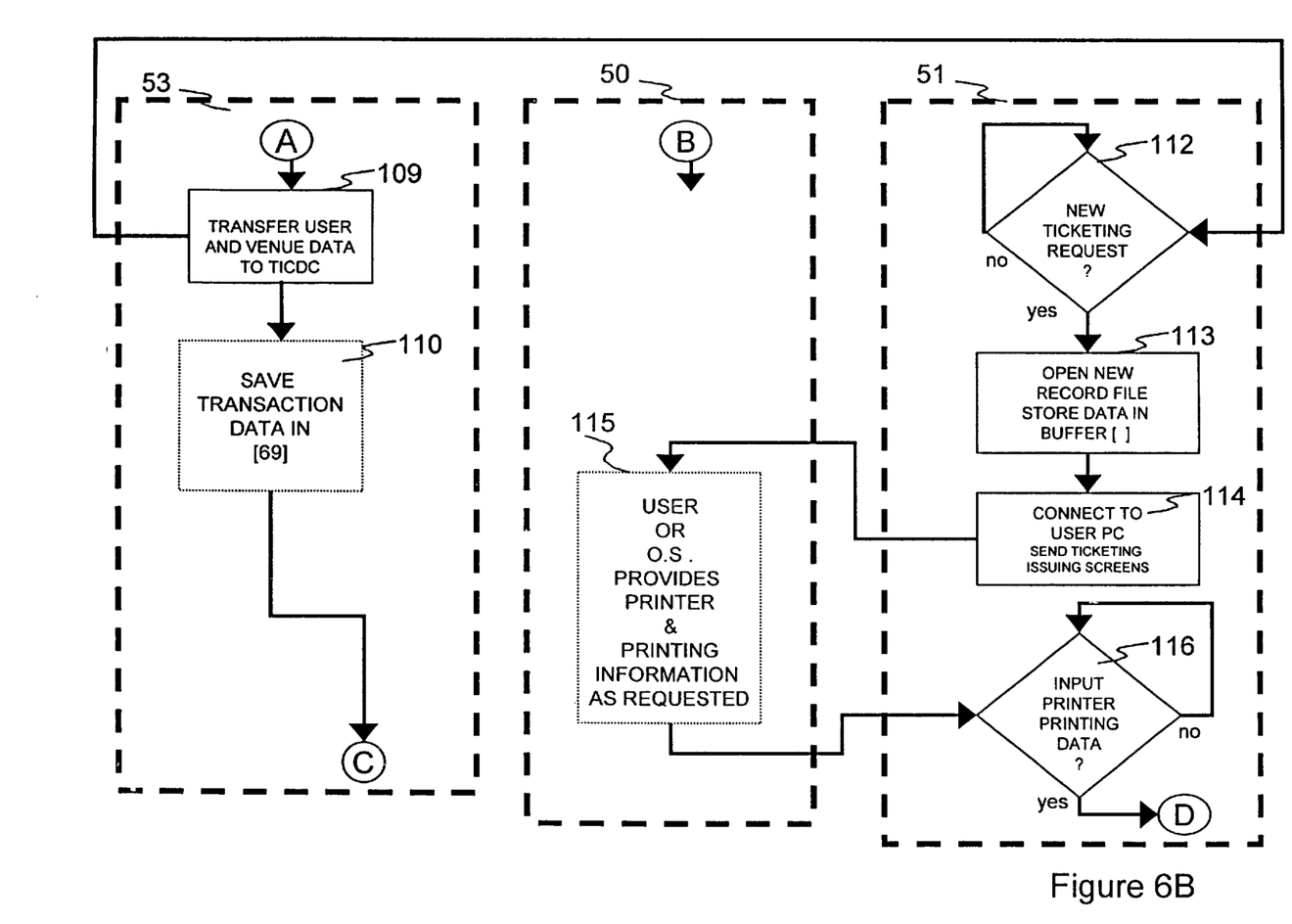

Now the program goes to decision block 104 in server 53. Block 104 determines whether or not a buyer has requested to purchase a ticket. If block 104 determines that a buyer has not requested to purchase, a ticket the program goes back to the input of block 104. If block 100 determines that a buyer has requested to purchase a ticket, the program goes to the input of block 105 to request information from the buyer regarding how the buyer is going to pay for the ticket. Then the program goes to block 106 in computer 50 where the buyer provides the requested payment information, i.e. issuer of credit card, name on credit card, credit card account number, credit card expiration date, etc. Now the program goes back to block 105, where the information provided by the buyer is collected. Now the program goes to decision block 107. Block 107 determines whether or not the buyer has paid for the ticket(s). If block 107 determines that the buyer has not paid for the ticket(s), the program goes back to the input of block 107. If block 107 determines that the buyer has paid for the ticket(s), the program goes to the input of decision block 108 in computer 50, and the input of block 109 in server 53 (FIG. 6B). Block 108 determines whether or not an image of ticket 11 is present. If block 108 determines that an image of ticket 11 is not present, the program goes back to the input of block 108.

Figure 6C:
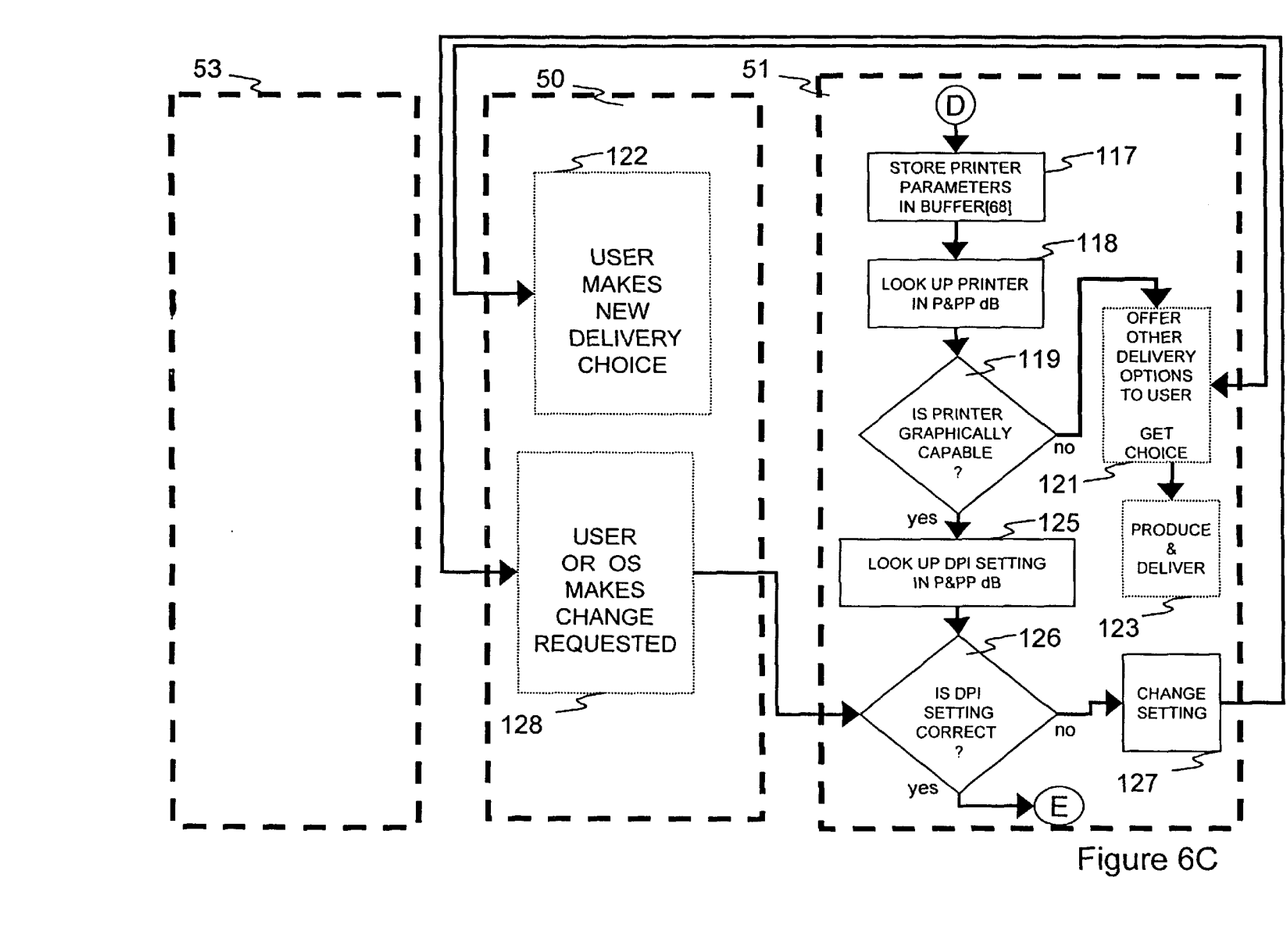
Figure 6D:
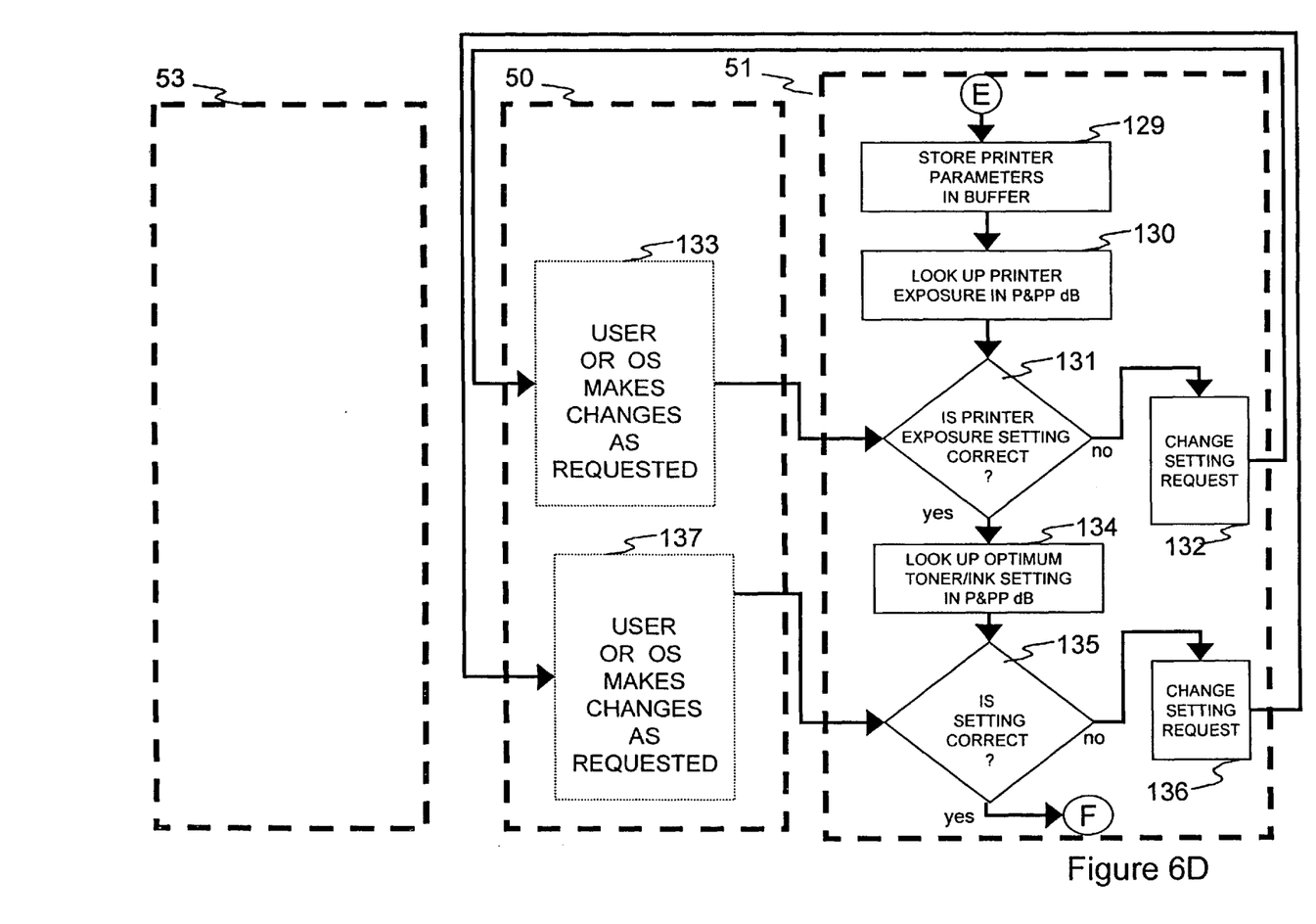
Figure 6E:
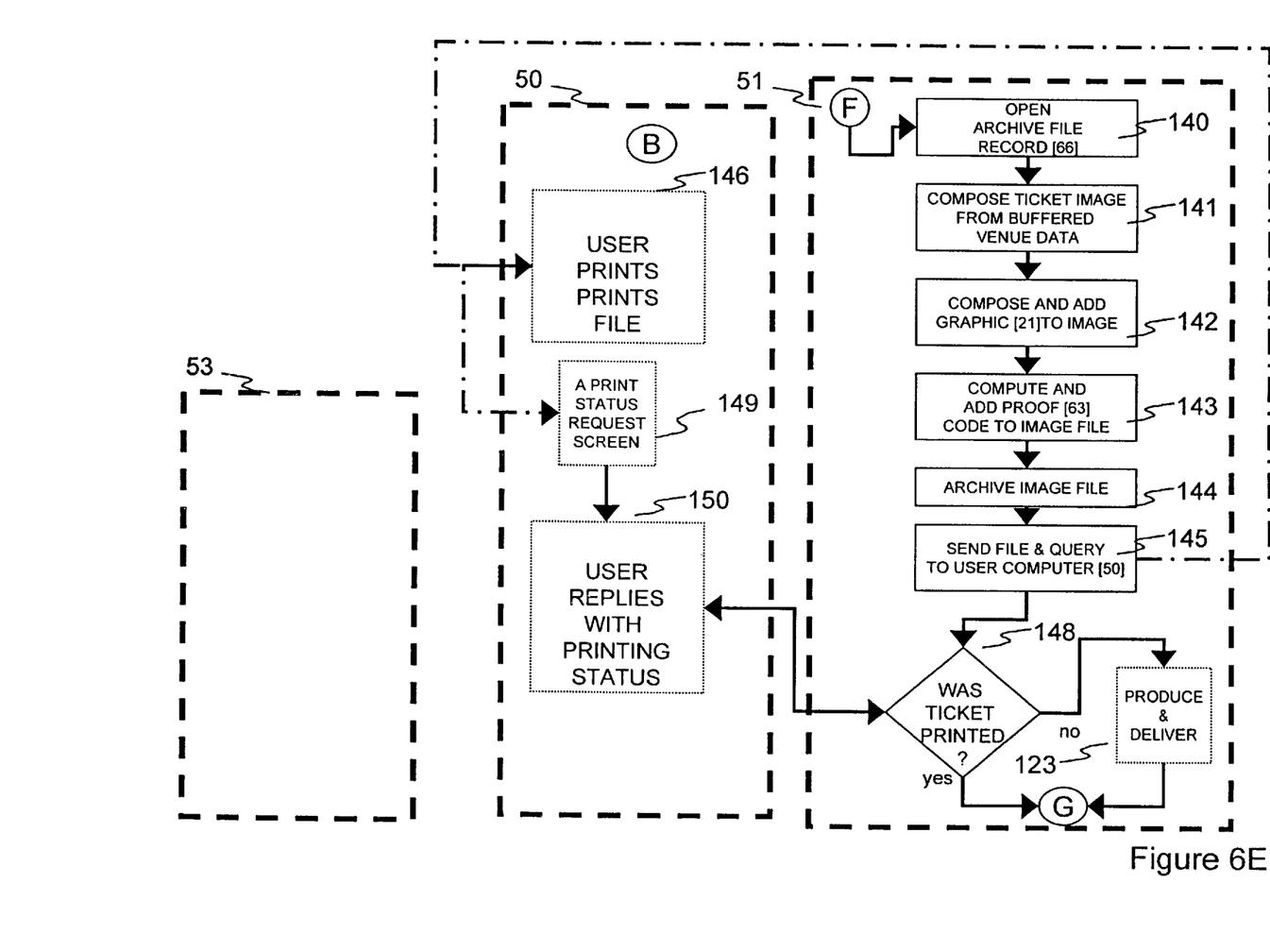
Figure 6F:
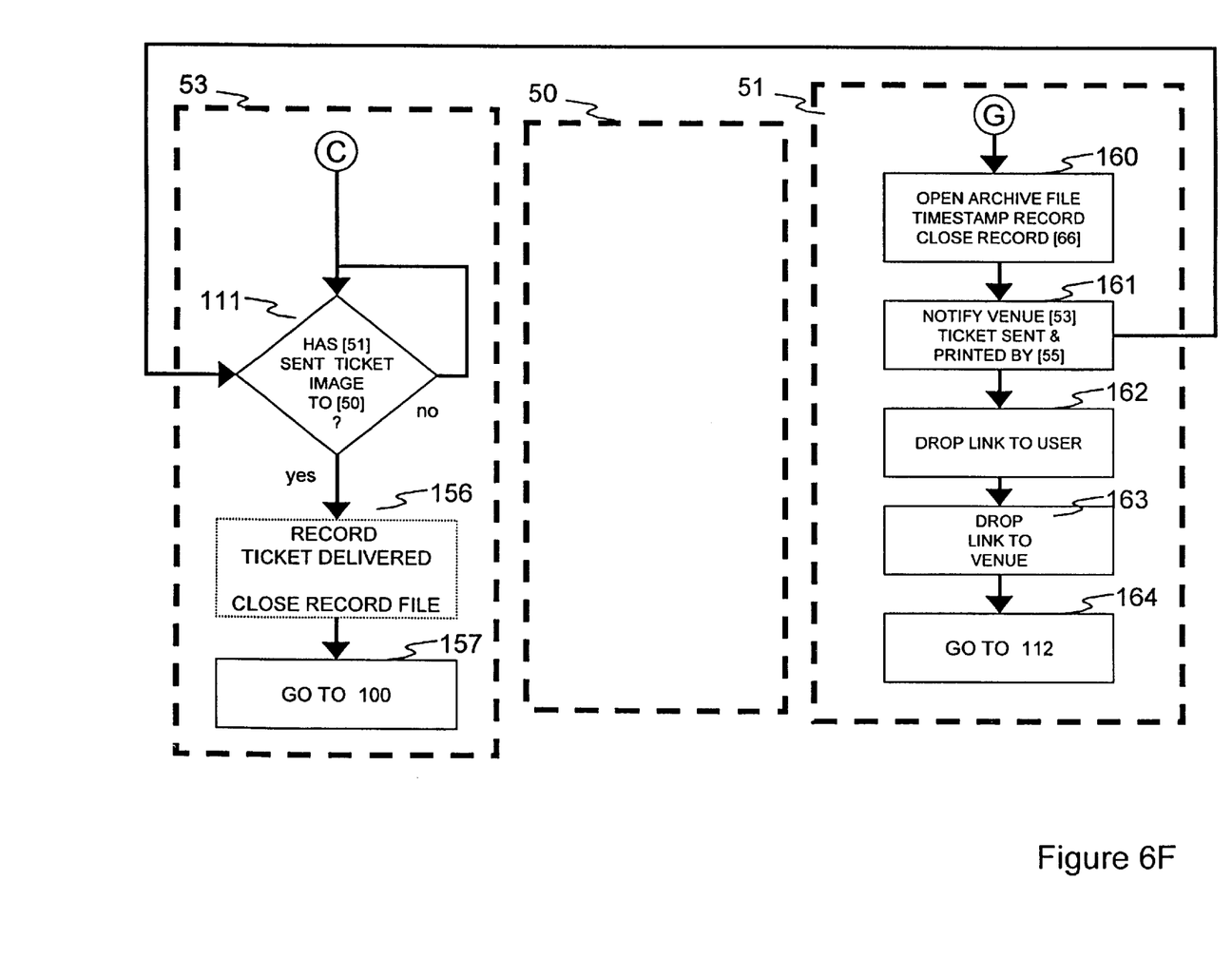

At this point, block 109 in server 53 transfers user and venue data to ticket data center 51, i.e., decision block 112 in data center 51, and saves the transaction data in block 110 (seating data base 69). Decision block 112 determines whether or not a new ticketing request has been received. If block 112 determines that a new ticketing request has not been received, the program goes back to the input of block 112. If block 112 determines that a new ticketing request has been received, the program goes to the input of block 113. Block 113 opens a new record file and stores the record in data buffer 68 (FIG. 5). Then the program goes to block 114 to connect to personal computer 50 and send the ticket issuing screens. Now the program goes to block 115 it in computer 50 to provide the printer and printing information as requested. Then the program goes to decision block 116. Decision block 116 determines whether or not printer data has been input to data center 51. If block 116 determines that printer data has not been input to data center 51, the program goes back to the input of block 116. If block 116 determines that printer data has been input to data center 51, the program goes to the input of block 117 (FIG. 6C). After saving the seating data, i.e., price of the seat for a particular place and time from buffer 69 of block 110 (FIG. 6B), the program goes to decision block 111 (FIG. 6F). Block 111 determines whether or not an image of ticket 11 has been sent to computer 50. If block 111 determines that an image of ticket 11 has not been sent to computer 50, the program goes back to the input of block 111.

As previously mentioned, the "yes" output of block 116 is sent to the input of block 117 (FIG. 6C). Block 117 stores the printer parameters in buffer 68 (FIG. 5). Now the program goes to block 118 to obtain information regarding the printer from printing and printer data base 65 (FIG. 5). Then the program goes to the input of decision block 119. Decision block 119 determines whether or not the printer is capable of printing graphic field 21. If block 119 determines that the printer is not capable of printing graphic field 21, the program goes to the input of block 121. Block 121 offers the buyer other ticket delivery options, i.e., receive ticket 11 at data center 51 or have the ticket mailed to the buyer, etc. The buyer then makes new delivery choices in block 122 in computer 50. Then the program goes to block 123 to produce and deliver the ticket to the buyer in accordance with the buyer's selected choices. If block 119 determines that the printer is not capable of printing graphic field 21, the program goes to the input of block 125. Block 125 obtains information regarding the number of dots per inch the printer is using from buffer 68 (FIG. 5).

At this point, the program goes to decision block 126. Block 126 determines whether or not the printer dots per inch setting is adequate to print graphic field 21 with the printer that is being used. If block 126 determines that the number of dots per inch setting is inadequate to print graphic field 21, the program goes to block 127 to change the setting. Then the program goes to block 128 in computer 50 where the operating system of computer 50 or the buyer resets the dots per inch setting of the printer. Now the program goes back to block 126 in data center 51. If block 126 determines that the number of dots per inch setting is adequate to print graphic field 21, the program goes to block 129 in data center 51 (FIG. 6D) to store the printer parameters in buffer 68 (FIG. 5).

Now the program goes to block 130 to look up the printer exposure in printing and printer data base 65 (FIG. 5). Then the program goes to decision block 131 to determine whether or not the printer exposure setting is correct. If block 131 determines that the printer exposure setting is incorrect, the program goes to block 133 in computer 50 where the operating system of computer 50 or the buyer makes the requested changes. Now the program goes back to block 131 in data center 51. If block 131 determines that the printer exposure setting is adequate to print graphic field 21, the program goes to block 134 to look up the optimum toner/ink setting in data base 65 (FIG. 5). Then the program goes to decision block 135 to determine whether or not the toner/ink setting is adequate to print graphic field 21. If block 135 determines that the toner/ink setting is incorrect, the program goes to block 136 to change setting request. Then the program goes to block 137 in computer 50 where the operating system of computer 50 or the buyer makes the requested changes. Now the program goes back to block 135 in data center 51. If block 135 determines that the toner/ink setting is adequate to print graphic field 21, the program goes to block 140 in data center 51 (FIG. 6E) to open an archive file record in archive 66. Then the program goes to block 141 to compose the image of ticket 11 from data buffer 68.

Then the program goes to block 142 to compose and add graphic field 21 to the image. Now the program goes to block 143 to compute and add proof code 63 to image file. At this point, the program goes to block 144 to archive the image file in issue ticket images data archive 66. Then the program goes to block 145 to send the image file and a query screen to computer 50. Now the program goes to block 146 in computer 50 to print the image file and to block 149 to display a request to the purchaser regarding the status of the printed ticket. Then the program goes to block 150 in computer 50 where the buyer replies with the ticket printing status. Then the program goes to decision block 148. Block 148 determines from the buyer whether or not the image on ticket 11 was printed. If block 148 determines that ticket 11 was not printed correctly, the program goes to block 123 to produce a ticket and deliver a ticket to the purchaser. Then the program goes to block 160. Now the program goes back to block 148 in data center 51. If block 148 determines that the image was printed, the program goes to block 160 in data center 51 (FIG. 6F) to open an archive file and time stamp a record closed.

At this point, the program goes to block 161 to notify seller server 53 that ticket 11 has been sent to computer 50 and printed by printer 55. Then the program goes back to the input of decision block 111 in seller server 63. If block 111 determines that an image of ticket 11 has been sent to computer 50 by data center 51, the program goes to the input of block 156 (FIG. 6F) to record the delivery of ticket 11 and close the record file. After going to block 161 the program goes to block 162 to disconnect from computer 50. Then the program goes to block 163 to disconnect from computer 53. Then the program goes to block 164 and back to block 112 to wait for a new ticketing request. After going to block 157, the program goes to block 100 to wait for a new ticketing request.

Figure 7:
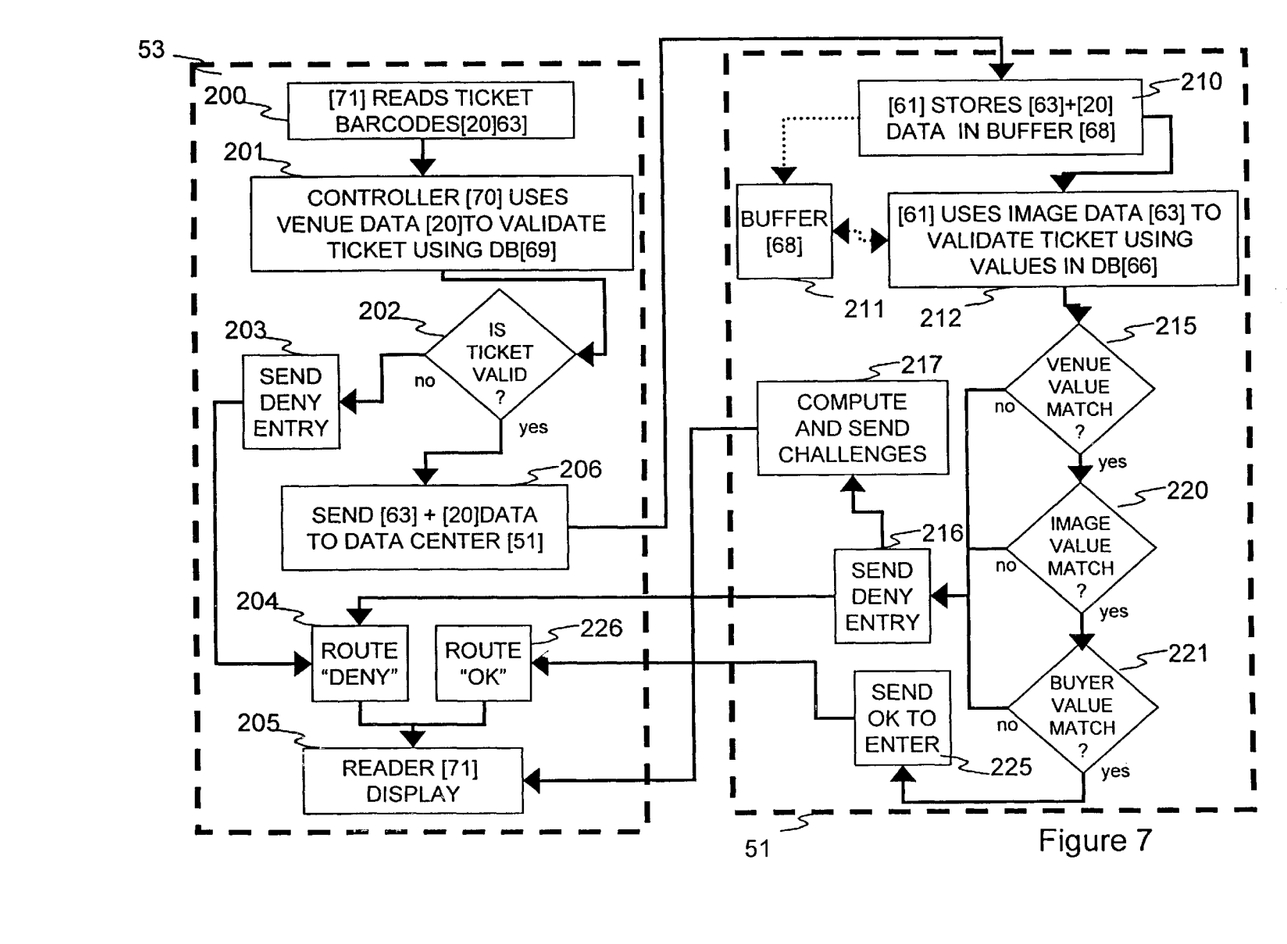
FIG. 7 is a flow chart showing the manner in which bar codes 20 and 63 of FIG. 1 are read.

FIG. 7 is a flow chart showing the manner in which bar codes 20 and 63 of FIG. 1 are read. The program begins in block 200 of seller server 53 where venue reader 51 (FIG. 5) reads bar codes 20 and 63 (FIG. 1). Then the program goes to block 201 where seller server controller 70 uses the venue data appearing in bar code 20 to validate ticket 11 using the information stored in seating data base 69. Now the program goes to decision block 202. Decision block 202 determines whether or not ticket 11 appears to be valid. If block 202 determines that ticket 11 is invalid, the program goes to block 203 to send a deny entry signal. Then the program goes to block 204 to route the deny entry signal. Next, the program goes to block 205 to display a message on reader 71 (FIG. 5) that indicates that entry should be denied to the holder of ticket 11. If block 202 determines that ticket 11 is valid, the program goes to block 206 to send the information in bar code 63 and the information in bar code 20 to data center 51.

At this point the program goes to block 210 in data center 51 where controller 61 stores the information in bar codes 63 and 20 in block 211 buffer 68. Then the program goes to block 212 where controller 61 uses image data obtained from bar code 63 and information contained in buffer 68 to validate ticket 11 using the values stored in data archive 66. Then the program goes to decision block 215. Decision block 215 determines whether or not the information in bar code 20 is the same as the information stored in archive 66. If block 215 determines that the information in bar code 20 is not the same as the information stored in archive 66, the program goes to block 216 to send a deny entry signal. Then the program goes to block 204 to route the deny entry signal. Next the program goes to block 205 to display a message on reader 71 (FIG. 5) that indicates that entry should be denied to the holder of ticket 11. Block 216 also goes to block 217. Block 217 computes and sends challenges, i.e., request additional information from the holder of ticket 11. Then the program goes to block 205 where the challenges are displayed on reader 71. If block 215 determines that the information in bar code 20 is the same as the information stored in archive 66, the program goes to decision block 220.

Decision block 220 determines whether or not the image value information in bar code 63 is the same as the information stored in archive 66. If block 215 determines that the image value information in bar code 63 is not the same as the information stored in archive 66, the program goes to block 216 to send a deny entry signal. Then the program goes to block 204 to route the deny entry signal. Next the program goes to block 205 to display a message on reader 71 (FIG. 5) that indicates that entry should be denied to the holder of ticket 11. Block 216 also goes to block 217. Block 217 computes and sends challenges, i.e., request additional information from the holder of ticket 11. Then the program goes to block 205 where the challenges are displayed on reader 71. If block 216 determines that the image value information in bar code 63 is the same as the information stored in archive 66, the program goes to decision block 221.

Decision block 221 determines whether or not the buyer value information in bar code 63 is the same as the information stored in archive 66. If block 215 determines that the buyer value information in bar code 20 is not the same as the information stored in archive 66, the program goes to block 216 to send a deny entry signal. Then the program goes to block 204 to route the deny entry signal. Next the program goes to block 205 to display a message on reader 71 (FIG. 5) that indicates that entry should be denied to the holder of ticket 11. Block 216 also goes to block 217. Block 217 computes and sends challenges, i.e., request additional information from the holder of ticket 11. Then the program goes to block 205 where the challenges are displayed on reader 71. If block 221 determines that the buyer value information in bar code 63 is the same as the information stored in archive 66, the program goes to block 225. Block 225 sends a valid ticket message to reader 71. Then the program goes to block 205 where a valid ticket message is displayed on reader 71, and the holder of ticket 11 is allowed to enter the event that is indicated on ticket 11 (FIG. 1).

The above specification describes a new and improved method for producing a unique number on a ticket that identifies the purchaser of the ticket based upon information obtained about the purchaser and the purchaser's computer system during the purchase of the ticket. It is realized that the above description may indicate to those skilled in the art additional ways in which the principles of this invention may be used without departing from the spirit. Therefore, it is intended that this invention be limited only by the scope of the appended claims.

What is claimed is:

1. A method for producing electronic tickets, comprising the steps of:

checking characteristics of a printer that is going to print a graphic field on the ticket that will change in appearance when the ticket is either reproduced by either scanning/printing and/or photocopying, printing the ticket if the checked characteristics are acceptable; and producing a unique number on the ticket that identifies the purchaser of the ticket based on information obtained about the purchaser and the purchaser's printer system during the purchase of the ticket.

2. The method claimed in claim 1, wherein the graphic field is a plurality of detectable half tone gray steps when printed by a personal computer printer.

3. The method claimed in claim 2, wherein a human eye will perceive the graphic field to vary from black to gray to white.

4. The method claimed in claim 1, wherein the graphic field is a continuum of spots that slowly vary from small white backgrounds with large black spots to small black spots on a white background.

5. The method claimed in claim 4, wherein the size of the spots are below the resolution limit of the human eye.

6. The method claimed in claim 1, wherein the scanning/printing and/or photocopying processes will produce mottle in a gray zone in the graphic field.

7. The method claimed in claim 1, wherein the scanning/printing and/or photocopying processes will produce bands in the graphic field.

8. The method claimed in claim 1, wherein the electronic ticket may be ordered over the internet.

9. The method claimed in claim 1, further including the steps of:

recording a test pattern on a material after the checking step so that a purchaser will be able to check the print quality of the printer before the ticket is printed.

10. The method claimed in claim 1, further including the steps of:

reading the unique number to determine if the ticket is valid.

11. The method claimed in claim 10, wherein the unique number includes:

the printer manufacturer.

12. The method claimed in claim 10, wherein the unique number includes:

the printer model number.

13. The method claimed in claim 10, wherein the unique number includes:

the printer settings of the printer.

14. The method claimed in claim 10, wherein the unique number is encrypted.

15. The method claimed in claim 10, wherein the unique number includes:

the postal address where the printer is located.

16. The method claimed in claim 10, wherein the unique number includes:

the date the ticket was printed.

17. The method claimed in claim 10, wherein the unique number includes:

the time the ticket was printed.

18. The method claimed in claim 10, wherein the unique number includes:

an assigned seat number.

19. The method claimed in claim 10, wherein the unique number includes:

a ticket buyer's name.

20. The method claimed in claim 10, wherein the unique number includes:

a ticket buyers address.

21. The method claimed in claim 10, wherein the unique number includes:

a ticket buyer's personal computer identification number.

* * * * *